United States Patent
Song et al.

(10) Patent No.: US 9,869,969 B2
(45) Date of Patent: Jan. 16, 2018

(54) HOLOGRAPHIC DISPLAY

(71) Applicant: SAMSUNG ELECTRONICS CO., LTD., Suwon-si (KR)

(72) Inventors: Hoon Song, Yongin-si (KR); Geeyoung Sung, Daegu (KR); Kanghee Won, Seoul (KR); Hongseok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 14/682,548

(22) Filed: Apr. 9, 2015

(65) Prior Publication Data

US 2015/0293497 A1  Oct. 15, 2015

(30) Foreign Application Priority Data

Apr. 9, 2014 (KR) .................. 10-2014-0042532

(51) Int. Cl.
*G02F 1/29* (2006.01)
*G03H 1/02* (2006.01)
(Continued)

(52) U.S. Cl.
CPC ............ *G03H 1/02* (2013.01); *G02B 5/06* (2013.01); *G02B 26/005* (2013.01); *G02B 26/0883* (2013.01); *G02F 1/133371* (2013.01); *G02F 1/292* (2013.01); *G03H 1/2286* (2013.01); *G03H 1/2294* (2013.01); *G03H 2001/0216* (2013.01); *G03H 2001/221* (2013.01);
(Continued)

(58) Field of Classification Search
CPC ..... G02F 1/133371; G02F 1/292; G03H 1/02; G03H 1/2286; G03H 1/2294; G03H 2001/0216; G03H 2001/221; G03H 2001/2292; G03H 2223/18; G03H 2227/03; G02B 5/06; G02B 26/005; G02B 26/0883
See application file for complete search history.

(56) References Cited

U.S. PATENT DOCUMENTS 7,215,475 B2  5/2007  Woodgate et al.
7,245,430 B2  7/2007  Kobayashi et al.
(Continued)

FOREIGN PATENT DOCUMENTS

DE  102009044910 A1  12/2010
JP       11308642 A    11/1999
(Continued)

OTHER PUBLICATIONS

Hahn, et al., "Wide viewing angle dynamic holographic stereogram with a curved array of spatial light modulators", Aug. 4, 2008, vol. 16, No. 16, Optics Express 12372, total 15 pages.
(Continued)

*Primary Examiner* — Bumsuk Won
*Assistant Examiner* — Ephrem Mebrahtu
(74) *Attorney, Agent, or Firm* — Sughrue Mion, PLLC (57) ABSTRACT

A holographic display includes: a light source; at least one beam steerer configured to control a propagation direction of a beam emitted from the light source; an optical element configured to condense a beam passing through the at least one beam steerer; and a spatial light modulator configured to form a three-dimensional (3D) image by modulating a beam passing through the at least one beam steerer.

12 Claims, 5 Drawing Sheets (51) Int. Cl.
    *G02B 26/00*     (2006.01)
    *G03H 1/22*      (2006.01)
    *G02B 5/06*      (2006.01)
    *G02B 26/08*     (2006.01)
    *G02F 1/1333*    (2006.01)

(52) U.S. Cl.
    CPC . *G03H 2001/2292* (2013.01); *G03H 2223/18* (2013.01); *G03H 2227/03* (2013.01)

(56) References Cited

U.S. PATENT DOCUMENTS

| | | |
|---|---|---|
| 7,626,644 B2 | 12/2009 | Shestak et al. |
| 7,636,184 B2 | 12/2009 | Schwerdtner |
| 7,839,548 B2 | 11/2010 | Schwerdtner |
| 7,959,294 B2 | 6/2011 | Balogh |
| 8,218,211 B2 | 7/2012 | Kroll et al. |
| 8,358,454 B2 | 1/2013 | Leister et al. |
| 8,379,079 B2 | 2/2013 | Kroll et al. |
| 8,576,490 B2 | 11/2013 | Bae et al. |
| 8,711,060 B2 | 4/2014 | Jung et al. |
| 8,730,282 B2 | 5/2014 | Bae et al. |
| 8,780,026 B2 | 7/2014 | Mun et al. |
| 8,873,004 B2 | 10/2014 | Bae et al. |
| 8,879,154 B2 | 11/2014 | Choi et al. |
| 8,982,438 B2 | 3/2015 | Choi et al. |
| 2005/0046951 A1 | 3/2005 | Sugihara et al. |
| 2007/0146358 A1 | 6/2007 | Ijzerman |
| 2010/0003378 A1 | 1/2010 | Longo et al. |
| 2010/0103485 A1* | 4/2010 | Haussler .............. G03H 1/02 359/9 |
| 2010/0157026 A1 | 6/2010 | Reichelt |
| 2010/0195178 A1 | 8/2010 | Leister et al. |
| 2010/0289870 A1 | 11/2010 | Leister |
| 2011/0063289 A1 | 3/2011 | Gantz |
| 2011/0141439 A1* | 6/2011 | Yamauchi .......... G02B 27/1046 353/31 |
| 2011/0170185 A1 | 7/2011 | Song et al. |
| 2011/0187635 A1 | 8/2011 | Lee et al. |
| 2011/0235145 A1 | 9/2011 | Futterer et al. |
| 2011/0242150 A1 | 10/2011 | Song et al. |
| 2012/0056879 A1 | 3/2012 | Song et al. |
| 2012/0086994 A1 | 4/2012 | Choi et al. |
| 2012/0139908 A1 | 6/2012 | Choi et al. |
| 2012/0139909 A1 | 6/2012 | Choi et al. |
| 2012/0176665 A1 | 7/2012 | Song et al. |
| 2012/0249537 A1* | 10/2012 | Bae .................... H04N 13/0497 345/419 |
| 2012/0306726 A1* | 12/2012 | Song ................. G01N 33/4836 345/32 |
| 2013/0021388 A1 | 1/2013 | Choi et al. |
| 2013/0077154 A1* | 3/2013 | Popovich ........... G02B 27/2214 359/316 |
| 2013/0208370 A1 | 8/2013 | Kim et al. |
| 2013/0286344 A1* | 10/2013 | Hayashi ................ G02F 1/1313 349/193 |
| 2013/0335795 A1 | 12/2013 | Song et al. |
| 2014/0016051 A1* | 1/2014 | Kroll ....................... G03H 1/22 349/15 |
| 2014/0168754 A1 | 6/2014 | Kim et al. |
| 2014/0210960 A1 | 7/2014 | Sung et al. |
| 2014/0285862 A1 | 9/2014 | Song et al. |
| 2014/0376207 A1* | 12/2014 | Futterer ............... G02B 6/0035 362/97.1 |
| 2016/0041524 A1 | 2/2016 | Song et al. |

FOREIGN PATENT DOCUMENTS

| | | |
|---|---|---|
| JP | 2002287086 A | 10/2002 |
| JP | 200577437 A | 3/2005 |
| JP | 2005223727 A | 8/2005 |
| KR | 1020060134965 A | 12/2006 |
| KR | 1020070038974 A | 4/2007 |
| KR | 1020070099143 A | 10/2007 |
| KR | 1020070108046 A | 11/2007 |
| KR | 10-2012-0010644 A | 2/2012 |
| KR | 10-2012-0134459 A | 2/2012 |
| KR | 10-2012-0063161 A | 6/2012 |
| KR | 10-2012-0089978 A | 8/2012 |
| KR | 10-2012-0122672 A | 11/2012 |
| KR | 10-2013-0011421 A | 1/2013 |
| KR | 10-2013-0022900 A | 3/2013 |
| KR | 10-2013-0044644 A | 5/2013 |
| KR | 1020140079266 A | 6/2014 |
| WO | 2004051323 A1 | 6/2004 |
| WO | 2011/067265 A1 | 6/2011 |

OTHER PUBLICATIONS

Yasuhiro Takaki, "Prospective Novel 3D Display Technology Development", Tokyo University of Agriculture and Technology, 3DSA 2012, pp. 1-51.

* cited by examiner

HOLOGRAPHIC DISPLAY

RELATED APPLICATION

This application claims the benefit of Korean Patent Application No. 10-2014-0042532, filed on Apr. 9, 2014, in the Korean Intellectual Property Office, the disclosure of which is incorporated herein in its entirety by reference.

BACKGROUND

1. Field

One or more exemplary embodiments relate to a holographic display capable of displaying three-dimensional images.

2. Description of the Related Art

With the popularity of three-dimensional (3D) movies, technology for 3D image displays has been researched. 3D image displays may display 3D images based on the principal of binocular parallax or disparity. For example, binocular-parallax 3D image displays provide left-eye and right-eye images having different viewpoints to left and right eyes of viewers so that the viewers may experience a 3D effect. Such 3D image displays may be classified as glasses-type 3D image displays requiring special glasses and non-glasses-type 3D image displays not requiring special glasses.

However, viewing binocular parallax 3D images can cause eye strain. In addition, 3D image displays providing only two viewpoints, that is, left-eye and right-eye images, are not able to deal with a varying viewpoint of a moving viewer, and thus are limited in expressing 3D effects.

Therefore, holographic displays capable of providing more natural 3D images have been researched.

SUMMARY

Provided is a holographic display capable of displaying three-dimensional (3D) images.

Additional aspects will be set forth in part in the description which follows and, in part, will be apparent from the description, or may be learned by practice of one or more exemplary embodiments.

According to an aspect of one or more exemplary embodiments, a holographic display includes: a light source; at least one beam steerer configured to control a propagation direction of a beam emitted from the light source; an optical element configured to condense a beam passing through the at least one beam steerer; and a spatial light modulator configured to form a three-dimensional (3D) image by modulating a beam passing through the at least one beam steerer.

The optical element includes: a collimating lens configured to collimate a beam emitted from the light source; and a field lens configured to form a viewing window of a beam passing through the spatial light modulator.

The collimating lens and the field lens are provided as a single lens.

The at least one beam steerer includes a first beam steerer and a second beam steerer disposed adjacent to each other.

The first and second beam steerers are configured to: focus a first beam emitted from the light source on a first focal point, and focus a second beam emitted from the light source on a second focal point by the first beam steerer primarily refracting the second beam and the second beam steerer secondarily refracting the second beam, thus widening a viewing angle of the holographic display.

The at least one beam steerer includes an active optical prism or a liquid crystal grating.

The at least one beam steerer includes the active optical prism. The active optical prism includes: a first electrode; a second electrode disposed facing the first electrode; a first medium disposed between the first and second electrodes; and a second medium disposed between the first and second electrodes, the first and second media having different refractive indexes.

The first medium includes a nonpolar fluid, and the second medium includes a polar fluid.

The first medium includes oil, and the second medium includes water.

The optical element includes a wave guide disposed between the at least one beam steerer and the spatial light modulator.

The at least one beam steerer is further configured to control the propagation direction of a light emitted from the light source to mimic light emitted from at least one virtual light source, the light mimicking being emitted from the at least one virtual light source being focused on a virtual focal point.

Light emitted from the light source without being controlled to mimic light emitted from a virtual light source is focused on a focal point. The holographic display satisfies the following equation:

$$A/B = A'/B'$$

where A denotes a distance between the light source and the spatial light modulator, B denotes a distance between the spatial light modulator and the focal point, A' denotes a distance between the light source and the at least one virtual light source, and B' denotes a distance between the focal point and the virtual focal point.

The at least one beam steerer is disposed closer to the light source than the spatial light modulator.

D is a distance between the light source and the spatial light modulator, and the at least one beam steerer is disposed within a range of D/2 from the light source.

The at least one beam steerer is further configured to focus a plurality of beams emitted from the light source on a plurality of focal points.

The light source is configured to emit coherent light.

The at least one beam steerer includes an active optical prism comprising a plurality of prism units. The plurality of prism units include respective: first electrodes; second electrodes disposed facing the first electrode; first media disposed between the first and second electrodes; and second media disposed between the first and second electrodes, the first and second media having different refractive indexes.

The at least one beam steerer comprises a liquid crystal grating includes: a first glass substrate; a second glass substrate; a first electrode disposed on the first glass substrate; a second electrode disposed on the second glass substrate; and a refractive index change layer disposed between the first and second glass substrates, the refractive index change layer including a plurality of liquid crystals and a plurality of prisms arranged in an alternating pattern.

The optical element includes a wave guide configured to guide a beam passing through the at least one beam steerer. The spatial light modulator is disposed in a direction different from a straight light propagation direction of the light source and the at least one beam steerer.

The at least one beam steerer is disposed between the optical element and the light source, the collimating lens is disposed between the at least one beam steerer and the spatial light modulator, and the spatial light modulator is disposed between the collimating lens and the field lens.

According to an aspect of one or more exemplary embodiments, a holographic display includes: a light source; a beam steerer configured to control a propagation direction of light emitted from the light source; a collimating lens configured to collimate light that exits the beam steerer; a spatial light modulator configured to form a three-dimensional (3D) image by modulating the collimated light; and a field lens configured to form a viewing window of the light that exits the spatial light modulator.

BRIEF DESCRIPTION OF THE DRAWINGS

These and/or other aspects will become apparent and more readily appreciated from the following description of one or more embodiments, taken in conjunction with the accompanying drawings in which.

DETAILED DESCRIPTION

Reference will now be made in detail to one or more exemplary embodiments, examples of which are illustrated in the accompanying drawings. In this regard, one or more exemplary embodiments may have different forms and should not be construed as being limited to the descriptions set forth herein. Accordingly, the exemplary embodiments described below, by referring to the figures, explain various aspects of one or more exemplary embodiments. As used herein, the term "and/or" includes any and all combinations of one or more of the associated listed items. Expressions such as "at least one of," when preceding a list of elements, modify the entire list of elements and do not modify the individual elements of the list.

Hereinafter, a holographic display will be described in detail according to one or more exemplary embodiments with reference to the accompanying drawings. In the drawings, like reference numbers refer to like elements, and the sizes of elements may be exaggerated for clarity of illustration. The exemplary embodiments described herein are for illustrative purposes only, and various modifications may be made thereto. It will also be understood that when a layer is referred to as being "on top of," "above," or "on" another layer or substrate, it can be directly on top of, above, or on the other layer or substrate, or intervening layers may also be present, unless explicitly described otherwise.

Figure 1:
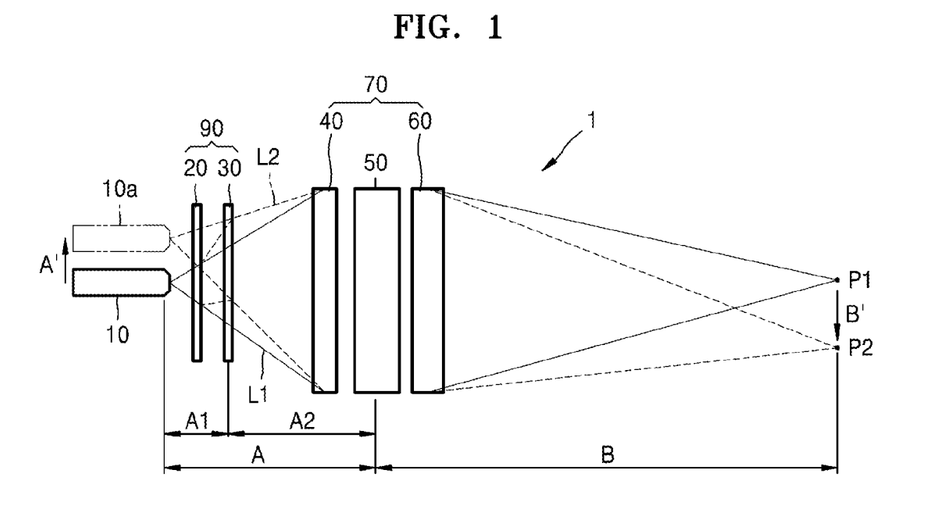
FIG. 1 is a schematic view illustrating a holographic display according to an exemplary embodiment.

FIG. 1 is a schematic view illustrating a holographic display 1 according to an exemplary embodiment. The holographic display 1 includes a light source 10, at least one beam steering element 90, i.e., at least one beam steerer, configured to control the direction of a beam emitted from the light source 10, an optical element 70 configured to condense a beam passing through the beam steering element 90, and a spatial light modulator 50 configured to modulate a beam passing through the at least one beam steering element 90 to form a 3D image.

The holographic display 1 is operated using wave properties of light such as diffraction or interference. However, autostereoscopic displays, multi-view displays, or super multi-view displays are operated using particle characteristics of light. Displays using wave characteristics of light and displays using particle properties of light are conceptually different displays.

The light source 10 may emit coherent light. Coherent light may have a constant wavelength and be collimated. For example, the light source 10 may include a laser unit, a light emitting device (LED), or a laser diode (LD). However, the light source 10 is not limited thereto.

The at least one beam steering element 90 may include a first beam steering element 20, i.e., a first beam steerer, and a second beam steering element 30, i.e., a second beam steerer. The first and second beam steering elements 20 and 30 may be disposed adjacent to each other. The first and second beam steering elements 20 and 30 may be adjacent to each other without any element disposed therebetween. The at least one beam steering element may be bigger or smaller than the spatial light modulator 50. The at least one beam steering element 90 may be disposed between the light source 10 and the spatial light modulator 50. The at least one beam steering element 90 may be closer to the light source 10 than the spatial light modulator 50. That is, the distance A1 between the at least one beam steering element 90 and the light source 10 may be shorter than the distance A2 between the at least one beam steering element 90 and the spatial light modulator 50. In this case, the distances A1 and A2 may be measured based on a beam steering element of the at least one beam steering element 90 relatively distant from the light source 10. For example, the distance A1 between the light source 10 and the second beam steering element 30 may be shorter than the distance A2 between the second beam steering element 30 and the spatial light modulator 50. For example, the at least one beam steering element 90 may be disposed within a range from the light source 10 that is half the distance (A) between the light source 10 and the spatial light modulator 50. If the at least one beam steering element 90 is disposed close to the light source 10, the size of the at least one beam steering element 90 may be decreased. That is, if the at least one beam steering element 90 is disposed close to the light source 10, a region of the at least one beam steering element 90 onto which light emitted from the light source 10 is incident may be decreased, and thus the size of the at least one beam steering element 90 may be decreased. The at least one beam steering element 90 may be smaller than the spatial light modulator 50. If the size of the at least one beam steering element 90 is decreased, the size of the holographic display 1 may also be decreased.

The at least one beam steering element 90 may control the direction of a beam emitted from the light source 10. The at least one beam steering element 90 may include at least one selected from the group consisting of diffraction devices, refraction devices, and reflection devices. For example, the at least one beam steering element 90 may include at least one selected from the group consisting of active optical prisms, liquid crystal gratings, and variable mirrors.

The optical element 70 may condense a beam passing through the at least one beam steering element 90. For example, the optical element 70 may include a collimating lens 40 configured to collimate a beam passing through the at least one beam steering element 90, and a field lens 60 configured to adjust a beam passing through the spatial light modulator 50 for obtaining a desired viewing window (viewing angle). The field lens 60 may be a condensing lens, and light diverging from the light source 10 may be condensed on the viewing window by the field lens 60. For example, the field lens 60 may be a diffractive optical element or a holographic optical element manufactured by forming the phase of a lens on a flat surface. The collimating lens 40 may be disposed in front of the spatial light modulator 50, and the field lens 60 may be disposed behind the spatial light modulator 50. However, one or more exemplary embodiments are not limited thereto. For example, the collimating lens 40 and the field lens 60 may be disposed behind the spatial light modulator 50.

The spatial light modulator 50 may receive an image signal and may modulate at least one of an amplitude and a phase of a beam emitted from the light source 10 according to the image signal. A beam modulated by the spatial light modulator 50 may form 3D images. For example, the spatial light modulator 50 may include an optical electrical device having refractive index variable according to an electric signal. For example, the spatial light modulator 50 may include an optical electrical material layer such as a liquid crystal layer. The phase of light passing through the spatial light modulator 50 may be controlled by applying a voltage to the optical electrical material layer to vary the refractive index of the optical electrical material layer. For example, the spatial light modulator 50 may include a computer generated hologram (CGH). The spatial light modulator 50 may include a plurality of pixels. The plurality of pixels of the spatial light modulator 50 may be arranged in the form of a two-dimensional matrix.

Next, an explanation will be given of how the holographic display 1 of one or more exemplary embodiments is operated.

A beam may be emitted from the light source 10, and the propagation direction of the beam may be changed by the at least one beam steering element 90. The at least one beam steering element 90 may create at least one virtual light source 10a. For example, the at least one beam steering element 90 may change the propagation direction of light emitted from the light source 10 to create an effect that a beam is emitted from a different position (i.e., the virtual light source 10a) from the light source 10.

For example, a first beam L1 emitted from the light source 10 may pass through the first and second beam steering elements 20 and 30, the collimating lens 40, the spatial light modulator 50, and the field lens 60, and may then be focused on a first focal point P1. If the propagation direction of a second beam L2 emitted from the light source 10 is varied by the first and second beam steering elements 20 and 30, the effect that the second beam L2 emitted from the virtual light source 10a adjacent to the light source 10 is focused on a virtual second focal point P2 may be obtained. That is, the second beam L2 emitted from the virtual light source 10a may be focused on the virtual second focal point P2.

Although a single virtual light source (the virtual light source 10a) is described as an example, in one or more exemplary embodiments, two or more virtual light sources may be created corresponding to two or more virtual focal points.

The light source 10 and the virtual light source 10a may satisfy the following Expression 1:

$$A/B = A'/B'$$ <Expression 1> where A denotes a distance between the light source 10 and the spatial light modulator 50, B denotes a distance between the spatial light modulator 50 and the first focal point P1, A' denotes a distance between the light source 10 and the virtual light source 10a, and B' denotes a distance between the first focal point P1 and the virtual second focal point P2. If Expression 1 is satisfied, a beam emitted from the virtual light source 10a may be focused on an imaging plane.

The first and second beam steering elements 20 and 30 may control the propagation direction of a beam to satisfy Expression 1. For example, a first beam L1 may pass through the first beam steering element 20 and the second beam steering element 30 and may focus on the first focal point P1. A second beam L2 may be primary refracted by the first beam steering element 20 and secondarily refracted by the second beam steering element 30, thereby obtaining the effect that the second beam L2 is emitted from the virtual light source 10a adjacent to the light source 10 and is focused on the virtual second focal point P2. In this manner, the viewing angle of the holographic display 1 may be increased using the first and second beam steering elements 20 and 30.

The viewing angle of the holographic display 1 may be determined according to the degree of diffraction and spreading of light. The following expression 2 relates to a diffraction angle.

$$\sin(\theta/2) = \lambda/d$$ <Expression 2> where θ denotes the angle of diffraction, λ denotes the wavelength of light, and d denotes a pixel size. According to Expression 2, the degree of light spreading (diffraction angle) may depend on the wavelength of light and the pixel size. That is, the viewing angle of the holographic display 1 may be determined by the pixel size. For example, the pixel size may be required to decrease to 1 μm or less for obtaining a sufficient viewing angle. However, it is difficult to manufacture the holographic display 1 if the pixel size of the holographic display 1 is too small. According to one or more exemplary embodiments, the viewing angle of the holographic display 1 may be increased by using the beam steering element 90 without having to increase the pixel size of the holographic display 1. In the holographic display 1, a plurality of pixels may be simultaneously used to express a single point in a space, and a plurality of spatial points may be expressed using a single pixel.

Figure 2:
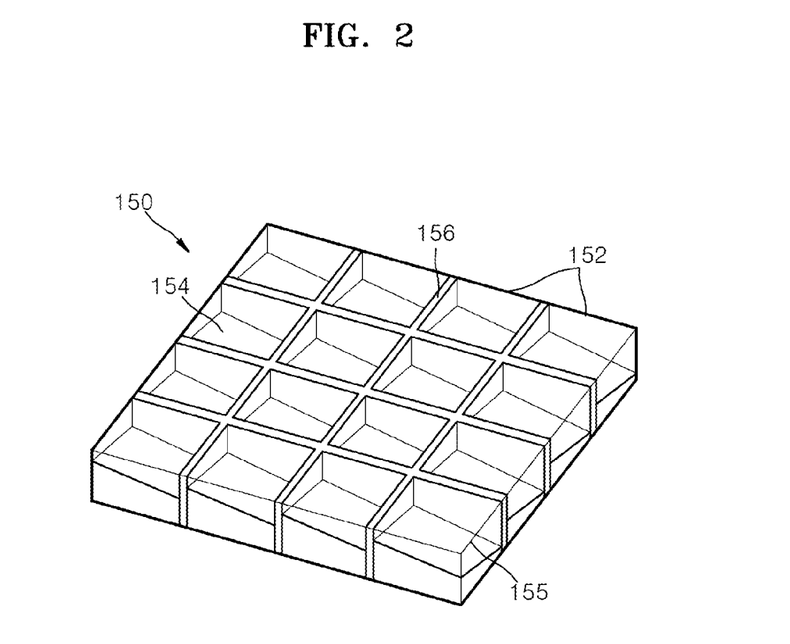
FIGS. 2 to 4 are views illustrating a beam steering element of the holographic display according to one or more exemplary embodiments.

For example, the at least one beam steering element 90 may be an active optical prism. FIG. 2 illustrates an exemplary active optical prism 150.

Referring to FIG. 2, the active optical prism 150 may be divided into a plurality of prism units 152, and the slopes of refraction surfaces 154 of the prism units 152 may be adjusted according to an electric signal so as to control the exit angles of light passing through the prism units 152. The active optical prism 150 may include an electric wetting device. The prism units 152 may be partitioned by barrier walls 156, and each of the prism units 152 may include a prism 155.

The prism units 152 of the active optical prism 150 may be two-dimensionally arranged.

Figure 3:
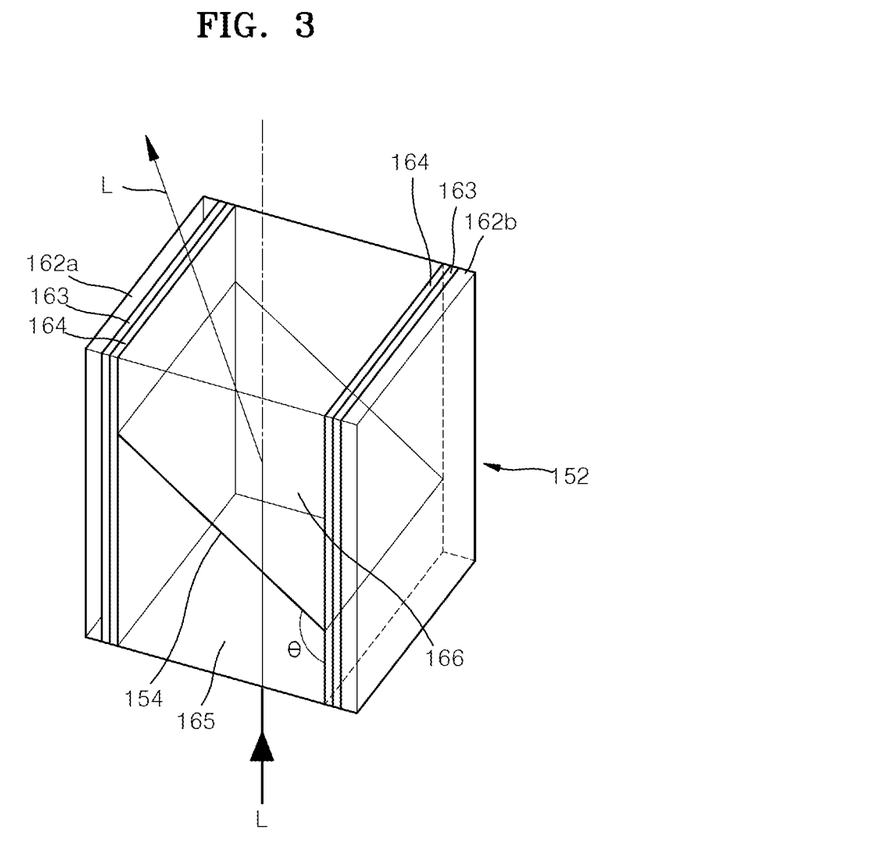

FIG. 3 is a schematic view illustrating a prism unit 152 of the active optical prism 150 according to an exemplary embodiment. Referring to FIG. 3, the prism unit 152 may include a first electrode 162a and a second electrode 162b that face each other. A first medium 165 and a second medium 166 having different refractive indexes may be disposed between the first and second electrodes 162a and 162b. For example, the first medium 165 may be a nonpolar fluid, and the second medium 166 may be a polar fluid. For example, the first medium 165 may be oil, and the second medium 166 may be water, alcohol, glycerin, or salt water. An interface between the first medium 165 and the second medium 166 functions as the refraction surface 154. Hydrophobic films 164 may be disposed on inner sides of the first and second electrodes 162a and 162b, respectively. In addition, an insulation layer 163 may be disposed between the first electrode 162a and the hydrophobic film 164, and another insulation layer 163 may be disposed between the second electrode 162b and the hydrophobic film 164. The insulation layers 163 may be formed of a hydrophobic material. In this case, the hydrophobic films 164 are not used.

In one or more exemplary embodiments, the prism unit 152 is operated by the first and second electrodes 162a and 162b. However, one or more exemplary embodiments are not limited thereto. For example, the prism unit 152 may be operated by four electrodes disposed on four lateral sides thereof.

Figure 4:
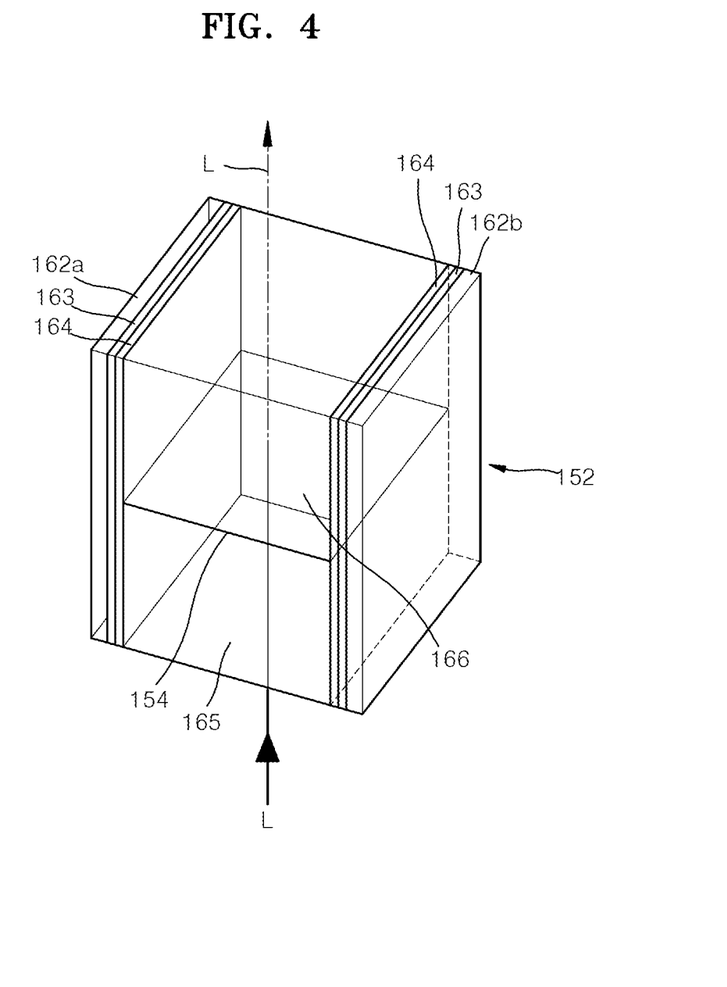

If a voltage is not applied between the first and second electrodes 162a and 162b, the first medium 165 forms a large contact angle θ with the hydrophobic film 164. If a voltage is applied between the first and second electrodes 162a and 162b, the contact angle θ between the hydrophobic film 164 and the first medium 165 is decreased, and the slope of the refraction surface 154 is varied. If the slope of the refraction surface 154 of the prism unit 152 is varied, the exit direction (propagation direction) of light passing through the prism unit 152 is varied. In this way, the propagation direction of light may be controlled by applying a voltage between the first and second electrodes 162a and 162b in an on-off manner or by varying a voltage applied between the first and second electrodes 162a and 162b. In FIG. 3, light L is refracted by the refraction surface 154 toward a left side. FIG. 4 illustrates that the refraction surface 154 is adjusted to be parallel with a light entrance surface by applying a voltage between the first and second electrodes 162a and 162b. In this case, light L may pass through the refraction surface 154 at a right angle. The slope of the refraction surface 154 may be varied according to the magnitude and direction of a voltage applied between the first and second electrodes 162a and 162b, and the propagation direction of light may be varied according to the slope of the refraction surface 154.

In one or more exemplary embodiments, the propagation direction of light may be adjusted using the active optical prism 150 so as to increase the angle of propagation light, and thus increase the viewing angle of the holographic display 1.

Figure 5:
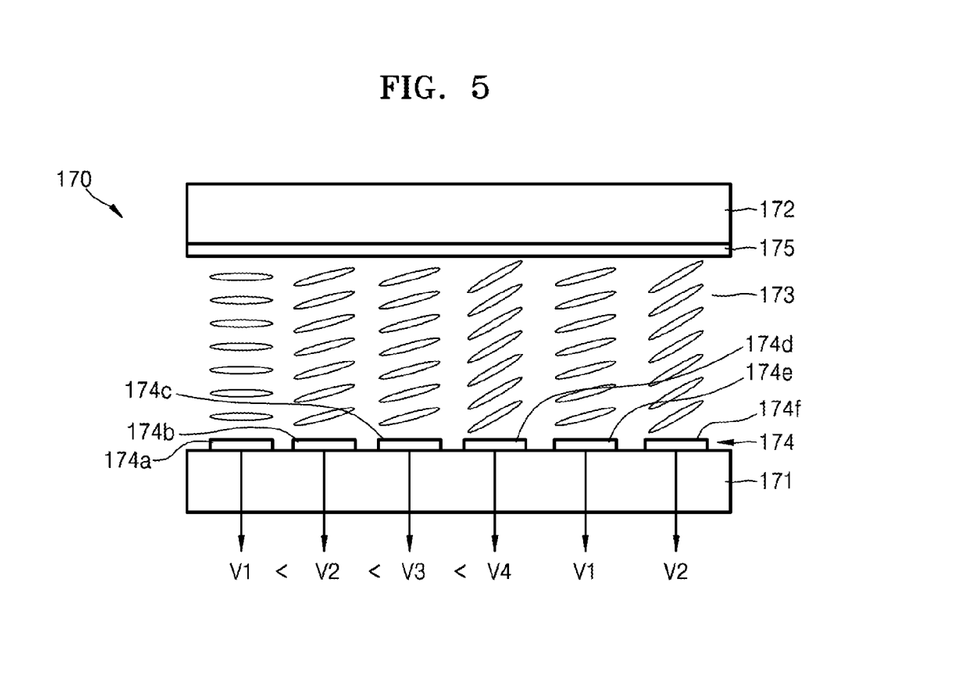
FIG. 5 is a view illustrating a beam steering element of the holographic display according to an exemplary embodiment.

FIG. 5 is a schematic view illustrating a liquid crystal grating 170 as the beam steering element 190 according to an exemplary embodiment.

The liquid crystal grating 170 may include a first glass substrate 171, a second glass substrate 172, and a liquid crystal layer 173 disposed between the first and second glass substrates 171 and 172. A first electrode 174 may be provided on a side of the first glass substrate 171, and a second electrode 175 may be provided on a side of the second glass substrate 172. The first and second electrodes 174 and 175 may be transparent electrodes.

At least one of the first electrode 174 and the second electrode 175 may include unit electrodes formed by patterning, and voltages may be independently applied to the unit electrodes. For example, the first electrode 174 may include first to sixth unit electrodes 174a, 174b, 174c, 174d, 174e, and 174f. A first voltage V1, a second voltage V2, a third voltage V3, and a fourth voltage V4, may be applied to the first unit electrode 174a, the second unit electrode 174b, the third unit electrode 174c, and the fourth unit electrode 174d, respectively. The first to fourth voltages V1, V2, V3, and V4 may satisfy the inequality of V1<V2<V3<V4. The first voltage V1 and the second voltage V2 may also be applied to the fifth unit electrode 174e and the sixth unit electrode 174f, respectively.

The refractive index of the liquid crystal layer 173 may be varied according to voltages applied between the first and second electrodes 174 and 175. For example, if voltages are sequentially or simultaneously applied to a pattern of the second electrode 175, the liquid crystal layer 173 may function as a prism or blazed grating in response to the applied voltages. The optical path of light may be varied by adjusting the magnitudes and order of voltages applied to each electrode pattern so as to operate the liquid crystal layer 173 as a prism or blazed grating.

Figure 6:
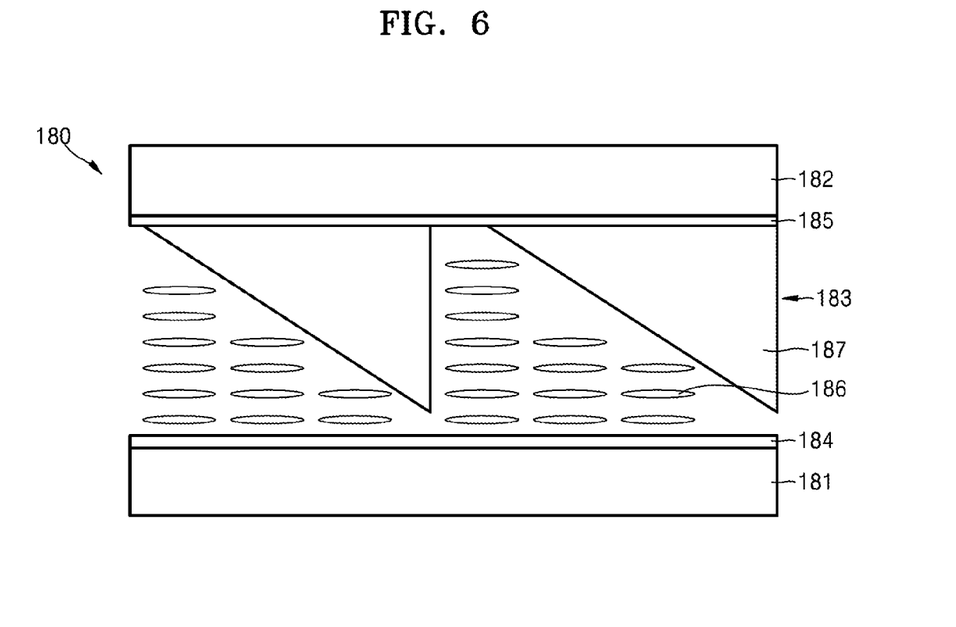
FIG. 6 is a view illustrating a beam steering element of the holographic display according to an exemplary embodiment.

Next, FIG. 6 illustrates a liquid crystal grating 180 according to an exemplary embodiment.

The liquid crystal grating 180 may include a first glass substrate 181, a second glass substrate 182, and a refractive index change layer 183 disposed between the first and second glass substrates 181 and 182. A first electrode 184 may be provided on a side of the first glass substrate 181, and a second electrode 185 may be provided on a side of the second glass substrate 182. The first and second electrodes 184 and 185 may be transparent electrodes. The refractive index change layer 183 may have a structure in which liquid crystal parts 186 and prisms 187 are alternatively arranged.

The refractive indexes of the liquid crystal parts 186 may be varied according to voltage applied between the first and second electrodes 184 and 185. When the refractive indexes of the liquid crystal parts 186 are equal to the refractive indexes of the prisms 187, light may propagate straight through the index change layer 183. When the refractive indexes of the liquid crystal parts 186 are different from the refractive indexes of the prisms 187, light may be refracted. That is, the propagation direction of light may be varied.

Figure 7:
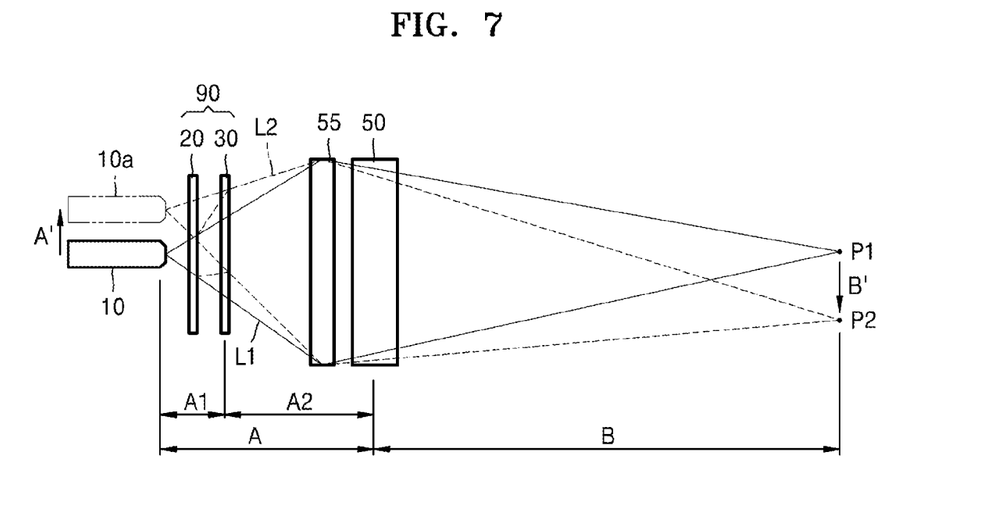
FIG. 7 is a schematic view illustrating a holographic display according to an exemplary embodiment.

FIG. 7 is a schematic view illustrating a modified holographic display according to an exemplary embodiment. In the example illustrated in FIG. 1, the optical element 70 includes the collimating lens 40 and the field lens 60. However, in the example illustrated in FIG. 7, a collimating lens and a field lens are combined into a single optical element 55. Since the optical element 55 has a combined structure, the holographic display may have a smaller size. The optical element 55 may be disposed in front of a spatial light modulator 50.

The other elements illustrated in FIG. 7 are substantially similar to those illustrated in FIG. 1, and thus detailed descriptions thereof will not be repeated.

Figure 8:
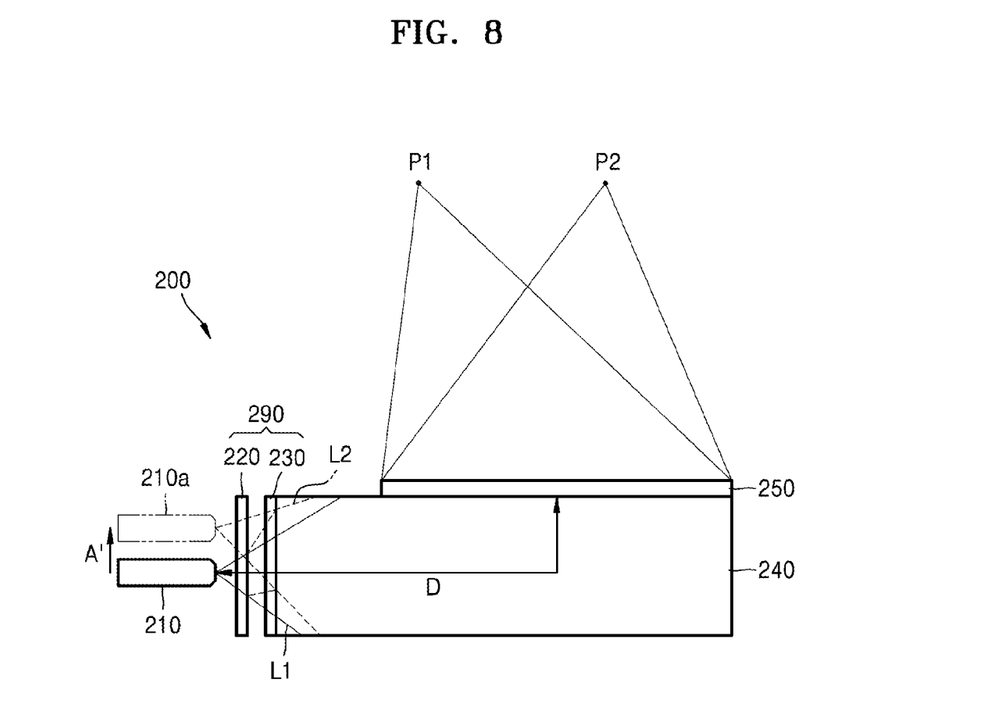
FIG. 8 is a schematic view illustrating a holographic display according to another embodiment.

FIG. 8 is a schematic view illustrating a holographic display 200 according to another exemplary embodiment. The holographic display 200 includes a light source 210, at least one beam steering element 290 configured to control the direction of a beam emitted from the light source 210, an optical element 240 configured to condense a beam passing through the at least one beam steering element 290, and a spatial light modulator 250 configured to modulate a beam passing through the at least one beam steering element 290 so as to form a 3D image.

The at least one beam steering element 290 may include a first beam steering element 220 and a second beam steering element 230. The first and second beam steering elements 220 and 230 may be disposed adjacent to each other. The first and second beam steering elements 220 and 230 may be disposed between the light source 210 and the optical element 240. For example, the first and second beam steering elements 220 and 230 may be disposed within a range of less than half the distance D between the light source 210 and the spatial light modulator 250. The distance D between the light source 210 and the spatial light modulator 250 may be an optical distance.

The optical element 240 may be a wave guide configured to guide a beam passing through the second beam steering element 230. The spatial light modulator 250 may display 3D images using a beam coming from the optical element 240. The structure of the holographic display 200 may be changed owing to the optical element 240 varying the propagation direction of light. In other words, elements of the holographic display 200 may be arranged in a direction different from a straight light propagation direction, and thus the holographic display 200 may have an efficient element arrangement.

The first and second beam steering elements 220 and 230 may include an active optical prism or a liquid crystal grating. The first and second beam steering elements 220 and 230 may control the propagation direction of a beam.

The at least one beam steering element 290 may create at least one virtual light source 210a. The at least one beam steering element 290 may change the propagation direction of light emitted from the light source 210 to create an effect that a beam is emitted from a different position (i.e., the virtual light source 210a) from the light source 210.

For example, a first beam L1 emitted from the light source 210 may pass through the first and second beam steering elements 220 and 230, the optical element 240, and the spatial light modulator 250, and may then be focused on a first focal point P1. If the propagation direction of a second beam L2 emitted from the light source 210 is varied by the first and second beam steering elements 220 and 230, the second beam L2 may appear to be emitted from the virtual light source 210a and be focused on the second focal point P2. For example, the second beam L2 may be primarily refracted by the first beam steering element 220 and secondarily refracted by the second beam steering element 230, thereby obtaining the effect that the second beam L2 is emitted from the virtual light source 210a and focused on the second focal point P2. In FIG. 8, a single virtual light source (the virtual light source 210a) is described. However, two or more virtual light sources may be created by the first and second beam steering elements 220 and 230.

As described above, according to the one or more of the above exemplary embodiments, the holographic display may control a region in which images are formed so as to provide a wide image display region.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims and their equivalents.

What is claimed is:

1. A holographic display comprising:
    a first light source configured to emit a first beam at a first time and a second beam at a second time;
    a first beam steerer including a first prism unit, the first prism unit including first electrodes and a first refraction surface disposed between the first electrodes;
    a second beam steerer disposed adjacent to the first beam steerer, the second beam steerer including a second prism unit, the second prism unit including second electrodes and a second refraction surface disposed between the second electrodes,
    wherein the first prism unit is configured to, in response to a voltage being applied between the first electrodes at the first time, receive the first beam emitted by the first light source, and allow the received first beam to pass through the first refraction surface at a right angle, and the second prism unit is configured to, in response to the voltage being applied between the second electrodes at the first time, allow the first beam passed through the first refraction surface at the right angle to pass through the second refraction surface at the right angle, and
    wherein the first prism unit is further configured to, in response to no voltage being applied between the first electrodes at the second time, receive the second beam emitted by the first light source, and primarily refract the received second beam, and the second prism unit is further configured to, in response to no voltage being applied between the second electrodes at the second time, secondarily refract the second beam primarily refracted by the first prism unit, to control a propagation direction of the emitted second beam to mimic light that is emitted from a virtual light source;
    an optical element configured to condense the first beam passed through the second refraction surface at the right angle, and condense the second beam secondarily refracted by the second prism unit; and
    a spatial light modulator configured to form a three-dimensional (3D) image by modulating the condensed first beam to focus on a first focal point, and modulating the condensed second beam to focus on a second focal point that is a virtual focal point,
    wherein the holographic display satisfies an equation:

$$A/B = A'/B',$$

where A denotes a distance between the first light source and the spatial light modulator, B denotes a distance between the spatial light modulator and the first focal point, A' denotes a distance between the first light source and the virtual light source, and B' denotes a distance between the first focal point and the virtual focal point.

2. The holographic display of claim 1, wherein the optical element comprises:
    a collimating lens configured to collimate the first beam passed through the second refraction surface at the right angle, and collimate the second beam secondarily refracted by the second prism unit; and
    a field lens configured to form a viewing window of the modulated first beam and the modulated second beam.

3. The holographic display of claim 2, wherein the collimating lens and the field lens are provided as a single lens.

4. The holographic display of claim 1, wherein each of the first beam steerer and the second beam steerer comprises an active optical prism, and
    wherein the active optical prism comprises:
    a first electrode;
    a second electrode disposed facing the first electrode;
    a first medium disposed between the first electrode and the second electrode; and a second medium disposed between the first electrode and the second electrode, the first medium and the second medium having different refractive indexes.

5. The holographic display of claim 4, wherein the first medium comprises a nonpolar fluid, and wherein the second medium comprises a polar fluid.

6. The holographic display of claim 5, wherein the first medium comprises oil, and wherein the second medium comprises water.

7. The holographic display of claim 1, wherein the optical element comprises a wave guide disposed between the second beam steerer and the spatial light modulator.

8. The holographic display of claim 1, wherein the first beam steerer and the second beam steerer are disposed closer to the first light source than the spatial light modulator.

9. The holographic display of claim 1, wherein D is a distance between the first light source and the spatial light modulator, and wherein the first beam steerer and the second beam steerer are disposed within a range of D/2 from the first light source.

10. The holographic display of claim 1, wherein the first light source is further configured to emit coherent light.

11. The holographic display of claim 1, wherein each of the first beam steerer and the second beam steerer comprises a plurality of prism units, and wherein the plurality of prism units comprise respective:
third electrodes;
fourth electrodes disposed facing the third electrode;
first media disposed between the third electrodes and the fourth electrodes; and
second media disposed between the third electrodes and the fourth electrodes, the first media and the second media having different refractive indexes.

12. The holographic display of claim 1, wherein the optical element comprises a wave guide configured to guide the first beam passing through the second refraction surface at the right angle, and guide the second beam secondarily refracted by the second prism unit, and wherein the spatial light modulator is disposed in a direction different from a straight light propagation direction of the first light source, the first beam steerer, and the second beam steerer.

* * * * *